United States Patent
Cho et al.

(10) Patent No.: US 10,511,811 B2
(45) Date of Patent: Dec. 17, 2019

(54) SURVEILLANCE CAMERA, RECORDING APPARATUS FOR SURVEILLANCE, AND SURVEILLANCE SYSTEM

(71) Applicant: Hanwha Techwin Co., Ltd., Seongnam-si (KR)

(72) Inventors: Sungbong Cho, Changwon-si (KR); Chanki Jeon, Changwon-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 378 days.

(21) Appl. No.: 14/948,864

(22) Filed: Nov. 23, 2015

(65) Prior Publication Data
US 2016/0182862 A1   Jun. 23, 2016

(30) Foreign Application Priority Data
Dec. 18, 2014   (KR) .................. 10-2014-0183299

(51) Int. Cl.
 *H04N 5/232*  (2006.01)
 *H04N 7/18*   (2006.01)
 *G08B 13/196* (2006.01)

(52) U.S. Cl.
 CPC ............. *H04N 7/181* (2013.01); *H04N 5/232* (2013.01); *H04N 5/23206* (2013.01); *H04N 5/23245* (2013.01); *G08B 13/19656* (2013.01); *G08B 13/19669* (2013.01)

(58) Field of Classification Search
 CPC .... H04N 7/181; H04N 5/232; H04N 5/23206; H04N 5/23245; G08B 13/19656; G08B 13/19669
 See application file for complete search history.

(56) References Cited

U.S. PATENT DOCUMENTS

| | | | |
|---|---|---|---|
| 7,107,152 B2 * | 9/2006 | Fixman | G06Q 30/02 702/3 |
| 8,935,045 B2 | 1/2015 | Kim et al. | |
| 9,049,363 B2 | 6/2015 | Choi et al. | |
| 9,488,490 B2 * | 11/2016 | Chintakindi | G01C 21/36 |
| 2004/0215483 A1 | 10/2004 | Fixman | |
| 2008/0050111 A1 | 2/2008 | Lee et al. | |

(Continued)

FOREIGN PATENT DOCUMENTS

| | | |
|---|---|---|
| CN | 101883214 A | 11/2010 |
| CN | 201677897 U | 12/2010 |

(Continued)

OTHER PUBLICATIONS

First Chinese Office Action dated Jul. 22, 2019; Appln. No. 201510959062.X.

Primary Examiner — Christopher G Findley
(74) Attorney, Agent, or Firm — Ladas & Parry LLP

(57) ABSTRACT

A network apparatus which may be connected to or included in a surveillance camera or a recorder is provided. The network apparatus includes: a communication interface configured to receive external information including at least one of weather information, traffic information, and event information received from at least one external server over a network; and a controller configured to adjust at least one of operating functions of at least one of a camera and a recorder connected to the camera, according to the external information.

17 Claims, 7 Drawing Sheets

(56) References Cited

U.S. PATENT DOCUMENTS

| | | | | |
|---|---|---|---|---|
| 2008/0267222 A1* | 10/2008 | Leung | ............... | H04N 21/23424 370/503 |
| 2011/0029243 A1* | 2/2011 | Gallagher | ............... | G01W 1/00 702/3 |
| 2012/0303215 A1* | 11/2012 | Kim | ............... | G01D 9/005 701/36 |
| 2014/0222321 A1* | 8/2014 | Petty | ............... | G01C 21/3492 701/117 |

FOREIGN PATENT DOCUMENTS

| | | |
|---|---|---|
| CN | 102725192 A | 10/2012 |
| CN | 102761687 A | 10/2012 |
| CN | 103700079 A | 4/2014 |
| JP | 2009-27651 A | 2/2009 |
| KR | 10-0780438 B1 | 11/2007 |
| KR | 10-2014-0071190 A | 6/2014 |
| KR | 10-2014-0081320 A | 7/2014 |

* cited by examiner

SURVEILLANCE CAMERA, RECORDING APPARATUS FOR SURVEILLANCE, AND SURVEILLANCE SYSTEM

CROSS-REFERENCE TO THE RELATED APPLICATION

This application claims priority from Korean Patent Application No. 10-2014-0183299, filed on Dec. 18, 2014, in the Korean Intellectual Property Office, the disclosure of which is incorporated herein in its entirety by reference.

BACKGROUND

1. Field

Apparatuses and methods consistent with exemplary embodiments relate to a surveillance camera, a recording apparatus for surveillance, a surveillance system and a network device, and more particularly, to a surveillance camera connected to at least one client terminal via the Internet, a recording apparatus for surveillance, a surveillance system including the surveillance camera and the network device that may be connected to or included in the surveillance camera and/or recording apparatus.

2. Description of the Related Art

In a surveillance system, at least one surveillance camera and at least one client terminal are connected to one another via the Internet, or a recording apparatus for surveillance, at least one surveillance camera, and at least one client terminal are connected to one another via the Internet.

In general, operating functions for a surveillance camera or a recording apparatus for surveillance may be changed directly by a manager according to a time schedule or according to signals generated by sensors installed in the surveillance camera.

SUMMARY

Exemplary embodiments of the inventive concept provide a surveillance camera which may be efficiently used by reducing surveillance downtime, a recording apparatus for surveillance, and a surveillance system.

Various aspects of the exemplary embodiments will be set forth in part in the description which follows and, in part, will be apparent from the description, or may be learned by practice of the presented exemplary embodiments.

According to an aspect of an exemplary embodiment, there is provided a network apparatus which may be connected to or included in a surveillance camera or a recorder. The network apparatus may include: a communication interface configured to receive external information including at least one of weather information, traffic information, and event information received from at least one external server over a network; and a controller configured to adjust at least one of operating functions of at least one of a camera and a recorder connected to the camera, according to the external information.

The weather information may be at least one of fog information, temperature information, rainfall information, thunder information, lightning information, and sunrise sunset information.

The operating functions include defog processing of an image, operation of a heater, operation of a wiper, and an image profile, by time slots, according to the weather information.

The image profile is at least one of a frame resolution, an image compression rate, bits per second (BPS), and frames per second (FPS) of at least one of the camera or the recorder.

The controller may control detection of an audio event not to be performed in a time slot when at least one of thunder and lightning is expected, according to at least one of the thunder information and the lightning information.

The controller may adjust times of switching between a daytime operation mode and a nighttime operation mode of at least one of the camera and the recorder, according to the sunrise sunset information.

The controller may adjust an image profile of at least one of the camera and the recorder, according to at least one of the traffic information and the event information.

The traffic information may be Transport Protocol Expert Group (TPEG) information, and the controller controls, to be relatively high, at least one of a frame resolution, an image compression rate, BPS, and FPS of at least one of the camera located in a place where an amount of a current traffic is greater than a reference amount and a recorder, based on the TPEG information.

The controller may control, to be relatively high, at least one of a frame resolution, an image compression rate, BPS, and FPS of at least one of the camera located in a place where an event is occurring and a recorder, according to the event information.

The controller may perform at least one of the operating functions earlier than a start time of the operating function set according to the weather information.

The operating functions may include defog processing of an image, operation of a heater, operation of a wiper, and adjusting an image profile.

According to an aspect of an exemplary embodiment, there is provided a method of controlling a camera and/or a recorder by using at least one processor, the method including: receiving external information comprising at least one of weather information, traffic information, and event information received from at least one external server over a network; and adjusting at least one of operating functions of at least one of a camera and a recorder connected to the camera, according to the external information.

The weather information may include at least one of fog information, temperature information, rainfall information, thunder information, lightning information, and sunrise sunset information.

The operating functions may include defog processing of an image, operation of a heater, operation of a wiper, and an image profile, by time slots, according to the weather information.

The image profile may include at least one of a frame resolution, an image compression rate, BPS, and FPS of at least one of the camera or the recorder.

The adjusting at least one of operating functions may include adjusting times of switching between a daytime operation mode and a nighttime operation mode of at least one of the camera and the recorder, according to the sunrise sunset information.

The adjusting at least one of operating functions may include adjusting an image profile of at least one of the camera and the recorder, according to at least one of the traffic information and the event information.

The adjusting at least one of operating functions may include controlling, to be relatively high, at least one of a frame resolution, an image compression rate, BPS, and FPS of at least one of the camera located in a place where an amount of a current traffic is greater than a reference amount and a recorder, based on the TPEG information.

The adjusting at least one of operating functions may include controlling, to be relatively high, at least one of a frame resolution, an image compression rate, BPS, and FPS of at least one of the camera located in a place where an event is occurring and a recorder, according to the event information.

The adjusting at least one of operating functions may include performing at least one of the operating functions earlier than a start time of the operating function set according to the weather information. Here, the operating functions may include defog processing of an image, operation of a heater, operation of a wiper, and adjusting an image profile.

According to the present inventive concept, a surveillance camera which may be efficient by reducing surveillance downtime, a recording apparatus for surveillance, and a surveillance system may be provided.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION OF THE EXEMPLARY EMBODIMENTS

Figure 1:
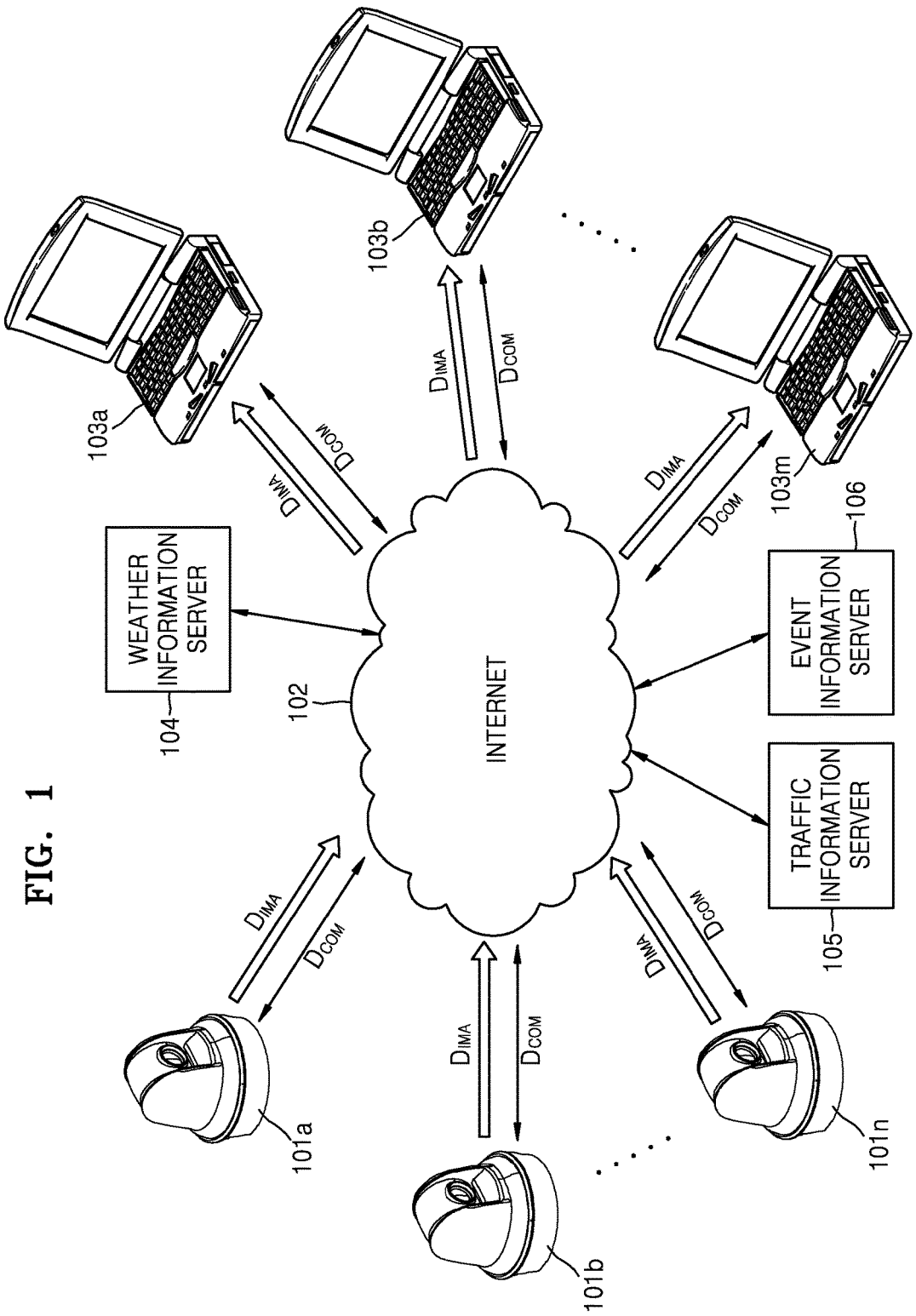
FIG. 1 illustrates a surveillance system, according to an exemplary embodiment.

Reference will now be made in detail to exemplary embodiments of the inventive concept, which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain various aspects of the inventive concept. As used herein, the term "and/or" includes any and all combinations of one or more of the associated listed items. Expressions such as "at least one of," when preceding a list of elements, modify the entire list of elements and do not modify the individual elements of the list.

FIG. 1 illustrates a surveillance system, according to an exemplary embodiment.

Referring to FIG. 1, the surveillance system according to the present exemplary embodiment may include a plurality of surveillance cameras 101a to 101n.

The surveillance cameras 101a to 101n are connected to at least one of a plurality of client terminals 103a to 103m, a weather information server 104, a traffic information server 105, and an event information server 106 via a network such as the Internet 102.

The surveillance cameras 101a to 101n may transmit live-view motion picture data $D_{IMA}$ to the client terminals 103a to 103m while exchanging communication signals $D_{COM}$ with the client terminals 103a to 103m.

Each of the surveillance cameras 101a to 101n may receive external information from an external server via the Internet 102, and change its own operating functions according to the external information.

The external information may be at least one of weather information, traffic information, event information, but not being limited thereto. The weather information may be at least one of fog information, temperature information, rainfall information, thunder and/or lighting information, and sunrise and/or sunset information. The traffic information may be, for example, Transport Protocol Expert Group (TPEG) information. The event information may be information related to, for example, terror events, thefts, runaway events, accidents, kidnapping events, etc.

The operating functions of a surveillance camera may be at least one of defog processing of an image, operation of a heater, operation of a wiper, an output image profile, detection of an audio event, and a switch time between a daytime operation mode and a nighttime operation mode, but not being limited thereto. The output image profile may be at least one of a frame resolution, a motion picture compression rate, bits per second (BPS), and frames per second (FPS). The detection of an audio event may means whether to detect sound having a predetermined frequency, such as voice or scream sensed by an audio sensor, as an event.

The weather information server 104 may be a server of a governmental meteorological center or any commercial weather information server.

The traffic information server 105 may be a server of a governmental policy agency, but not being limited thereto. The traffic information server 105 may provide broadcast information related to traffic.

The event information server 106 may be another server of the governmental police agency, but not being limited thereto. The event information server 106 may provide broadcast information related to terror, thefts, escape, accidents, kidnapping, etc.

A surveillance system according to the present exemplary embodiment may provide an efficient surveillance camera having reduced surveillance downtime by using the external information.

Figure 2:
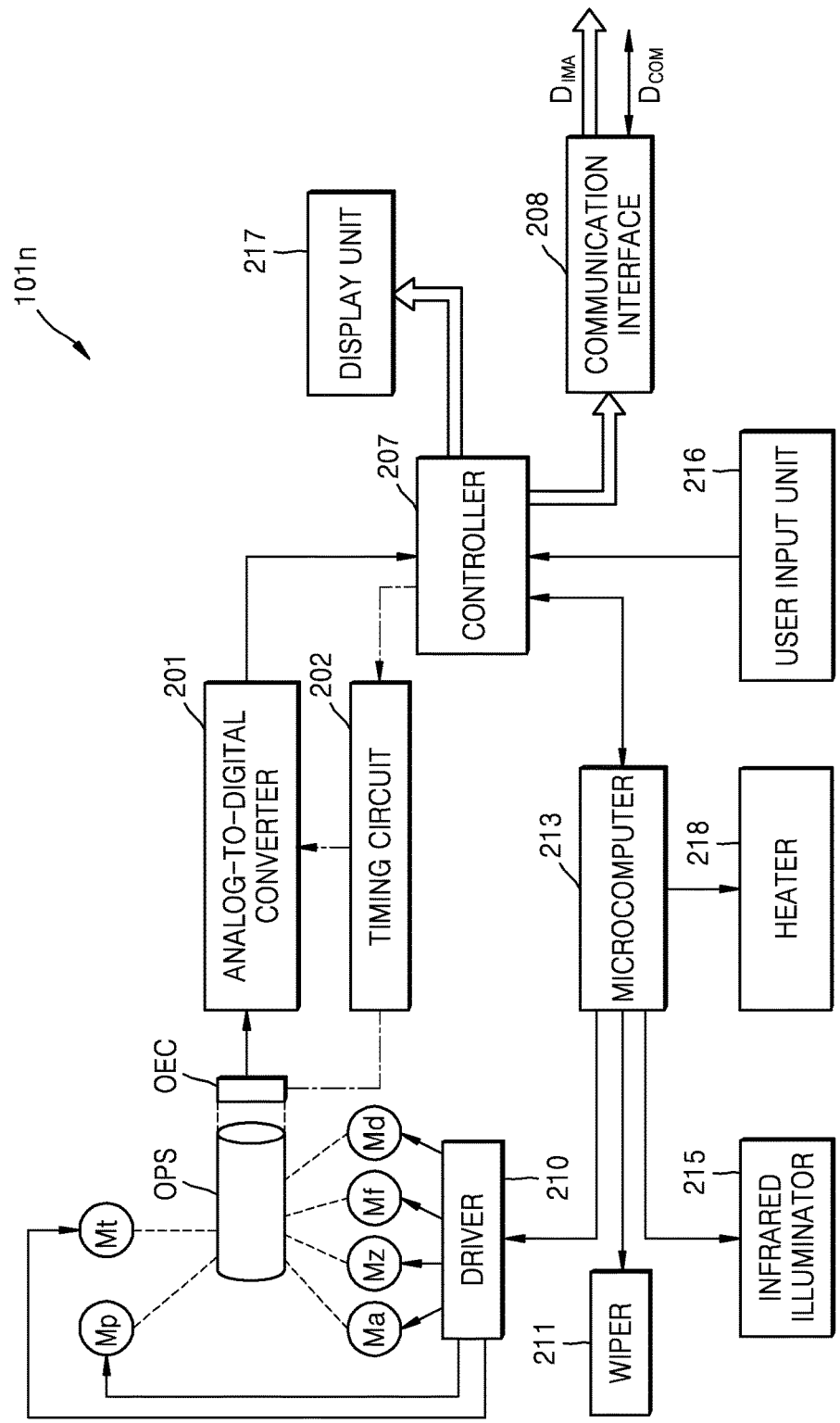
FIG. 2 is a block diagram of a structure of a surveillance camera included in the surveillance system of FIG. 1, according to an exemplary embodiment.

FIG. 2 is a block diagram of a structure of a surveillance camera 101n included in the surveillance system of FIG. 1, according to an exemplary embodiment.

Referring to FIG. 2, the surveillance camera 101n according to the present exemplary embodiment may include an optical system OPS, an optoelectric converter OEC, an analog-to-digital converter 201, a timing circuit 202, a controller 207, a communication interface 208, a driver 210, a wiper 211, a microcomputer 213, an aperture motor Ma, a zoom motor Mz, a focus motor Mf, a filter motor Md, a panning motor Mp, a tilting motor Mt, an infrared illuminator 215, a user input unit 216, a display unit 217, and a heater 218.

The OPS optically processes light from an object. The OPS may include a plurality of lenses and an infrared (IR) cut-off filter. The lenses may include a zoom lens and a focus lens.

The OEC may convert light from the OPS to an electrical analog image signal. The OEC may include a charge coupled device (CCD) or a complementary metal-oxide semiconductor (CMOS).

The analog-to-digital converter 201 converts an analog image signal from the OEC to a digital image signal. For example, the analog-to-digital converter 201 may remove high-frequency noise of the analog image signal, adjust an amplitude of the analog image signal, and convert the analog image signal to digital image data.

The timing circuit 202 outputs a timing signal.

The controller 207 controls an operation of the surveillance camera 101n. The controller 207 may operate according to control data from the user input unit 216, and may include a digital signal processor. The controller 207 may control operations of the OEC and the analog-to-digital converter 201 based on the timing signal from the timing circuit 202, and convert a format of the digital image signal from the analog-to-digital converter 201. For example, the controller 207 may process the digital image signal to generate digital image signals classified into a luminance signal and a chrominance signal.

The communication interface 208 transmits the live-view motion picture data $D_{IMA}$ to the client terminals 103a to 103m while exchanging communication signals $D_{COM}$ with the client terminals 103a to 103m. The communication interface 208 receives external information from at least one of the weather information server 104, the traffic information server 105, and the event information server 106.

The driver 210 drives the Ma, the Mz, the Mf, the Md, the Mp, and the Mt. The aperture motor Ma drives an aperture (not shown), the zoom motor Mz drives a zoom lens (not shown), and the focus motor Mf drives a focus lens (not shown). The filter motor Md drives an IR cut-off filter (not shown). The panning motor Mp rotates the OPS to the left and the right. The tilting motor Mt tilts an assembly of the OPS and the OEC, up and down.

The microcomputer 213 controls operations of the driver 210, the wiper 211, the infrared illuminator 215, and the heater 218 according to command signals from the controller 207.

The display unit 217 displays live-view motion picture from the controller 207.

The controller 207 changes operating functions of the surveillance camera 101n according to the external information.

According to the present exemplary embodiment, the controller 207 changes the operating functions of the surveillance camera 101n according to the weather information. For example, the controller 207 may control at least one of defog processing of an image, operation of a heater, operation of a wiper, and an output image profile, by time slots, based on at least one of fog information, temperature information, and rainfall information. The controller 207 may control detection of an audio event not to be performed in a time slot when thunder and/or lightning are expected, based on the thunder and/or lightning information. The controller 207 may control switch times between a daytime operation mode and a nighttime operation mode, based on the sunrise sunset information. For example, the controller 207 may change between the daytime operation mode and the nighttime operation mode differently from a preset switch time, based on the weather information or sunrise sunset information which varies according to weather.

According to another exemplary embodiment, the controller 207 changes the operating functions of the surveillance camera 101n according to the traffic information. For example, the controller 207 may control at least one of a frame resolution, a motion picture compression rate, a BPS, and an FPS of a traffic monitoring camera (not shown) located at a place where a current traffic amount is large, to be relatively high, based on the TPEG information.

According to another exemplary embodiment, the controller 207 changes the operating functions of the surveillance camera 101n according to the event information. For example, the controller 207 may control, to be relatively high, at least one of a frame resolution, a motion picture compression rate, a BPS, and an FPS of a crime prevention camera (not shown) located in a place where an event is occurring, based on the event information.

Figure 3:
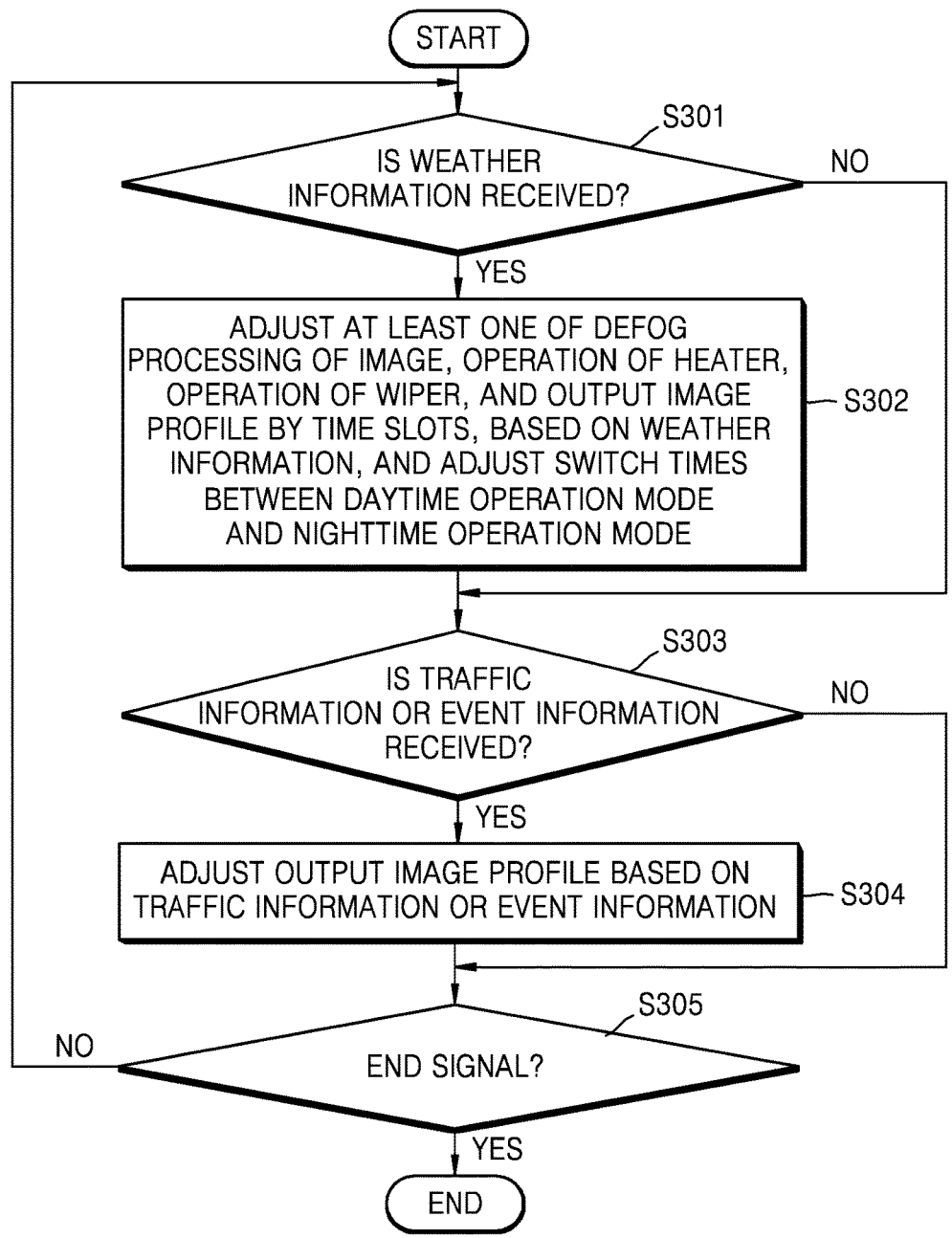
FIG. 3 is a flowchart of an operation of the surveillance camera of FIG. 2, according to an exemplary embodiment.

FIG. 3 is a flowchart of an operation of the surveillance camera of FIG. 2, according to an exemplary embodiment.

Referring to FIGS. 1 to 3, when the communication interface 208 receives weather information from the weather information server 104 via the Internet 102 (S301), the controller 207 may adjust at least one of defog processing of an image, operation of a heater, operation of a wiper, and an output image profile, by time slots, based on the weather information, and may also adjust switch times between a daytime operation mode and a nighttime operation mode, based on the weather information (S302).

For example, the controller 207 may perform defog processing of an image based on the fog information received from the weather information server 104, and control the defog processing of an image to start slightly earlier (e.g., a predetermined amount of time) than a start time set according to the fog information. Accordingly, surveillance downtime which may occur just before the defog processing of an image is performed may be prevented.

In another example, the controller 207 may control the operation of the heater 218 or the wiper 211 based on the temperature information or the rainfall information received from the weather information server 104 such that the heater 218 or the wiper 211 begins to operate slightly earlier than a start time set according to the temperature information or the rainfall information. Accordingly, surveillance downtime occurring just before the heater 218 or the wiper 211 is operated may be prevented. In this state, since the controller 207 does not need a temperature sensor or a rainfall sensor, the operation of the surveillance camera 101n may be controlled more efficiently.

In another example, the controller 207 may control switch times between a daytime operation mode and a nighttime operation mode based on the sunrise and/or sunset information received from the weather information server 104. Accordingly, the controller 207 may previously set switch times between a daytime operation mode and a nighttime operation mode corresponding to a change in season and weather. Accordingly, inconvenience occurring when a daytime operation mode and a nighttime operation mode are manually switched, inaccuracy occurring when the switch times between a daytime operation mode and a nighttime operation mode are arbitrarily set, or repeated changes between a daytime operation mode and a nighttime operation mode occurring due to instability in an amount of incident light when the switch times between a daytime operation mode and a nighttime operation mode are adjusted based on the amount of incident light, may be prevented.

In S302, the controller 207 may change the operating functions such that the detection of an audio event is not performed in a time slot when thunder and/or lightning are expected based on the weather information.

When the communication interface 208 receives traffic information from the traffic information server 105 or event information from the event information server 106 through the Internet 102 (S303), the controller 207 controls an output image profile based on the traffic information or the event information (S304).

S301 to S304 are repeatedly performed until an end signal is generated (S305).

The above changes in the operating functions of the surveillance camera 101n may be used later for searching for an event or an image.

Figure 4:
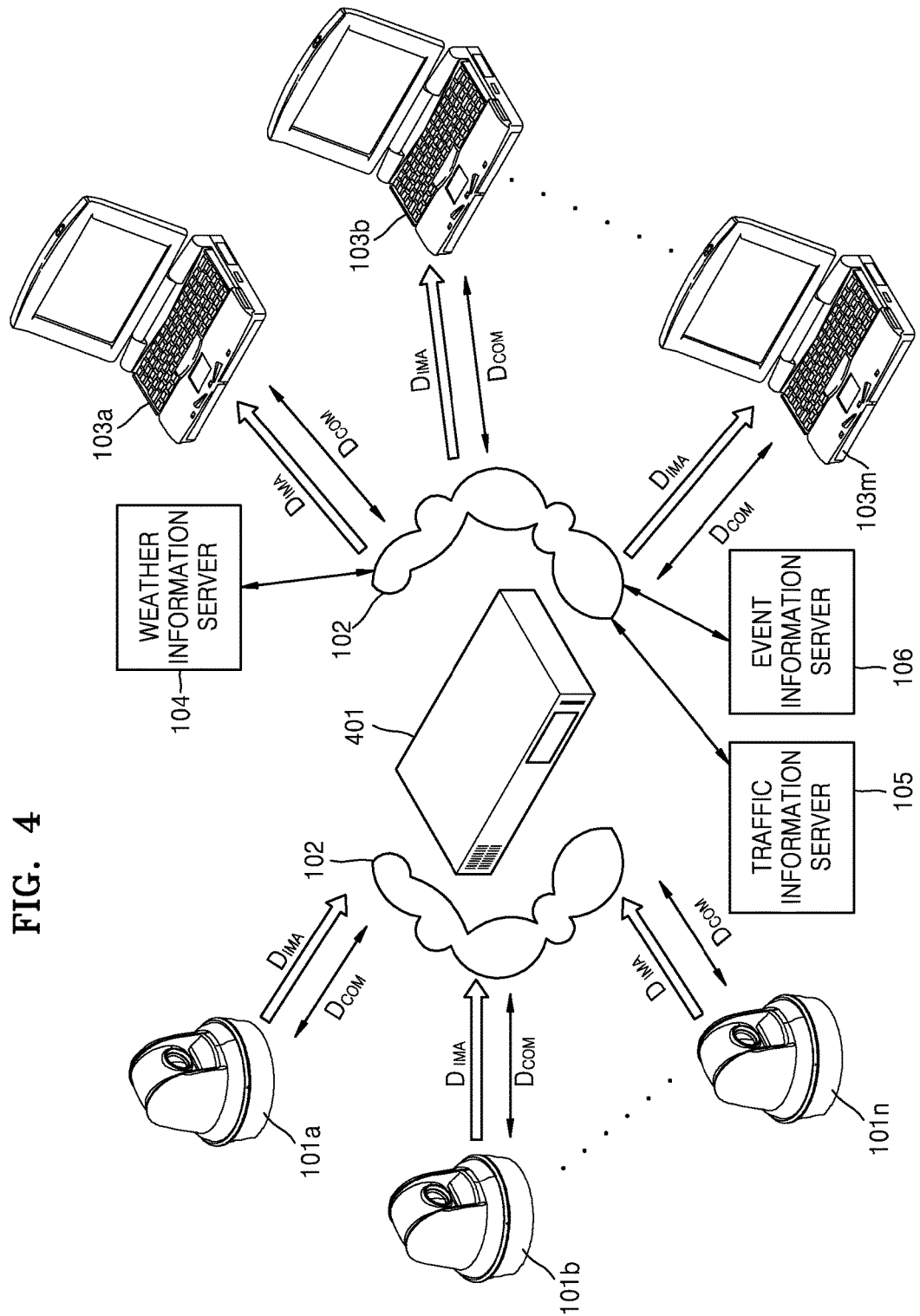
FIG. 4 illustrates a surveillance system according to another exemplary embodiment.

FIG. 4 illustrates a surveillance system according to another exemplary embodiment.

Referring to FIG. 4, a recording apparatus 401 for surveillance according to the present exemplary embodiment store the live-view motion picture data $D_{IMA}$ received from each of the surveillance cameras 101a to 101n and broadcast the live-view motion picture data $D_{IMA}$ to each of the client terminals 103a to 103m.

The recording apparatus 401 for surveillance according to the present exemplary embodiment may receive external information from an external sever via the Internet 102, and change operating functions of the recording medium according to the external information.

In the present exemplary embodiment, the recording apparatus 401 for surveillance may adjust a compression function of motion picture data to be stored in the recording medium based on the traffic information or the event information.

For example, the recording apparatus 401 for surveillance may adjust a compression function of motion picture data based on the traffic information such as the TPEG information. In this state, when receiving the motion picture data from the traffic monitoring camera located at a place where a current traffic amount is large, the recording apparatus 401 for surveillance may adjust the compression rate of a motion picture to be relatively low. As a result, the compression rate of a motion picture of each channel may be adjusted to be inversely proportional to the traffic amount.

In another example, the recording apparatus 401 for surveillance may adjust a compression function of motion picture data based on the event information. In this state, when receiving the motion picture data from a crime prevention camera located at a place where an event is currently generated and ongoing, the recording apparatus 401 for surveillance may adjust the compression rate of a motion picture to be relatively low.

According to the recording apparatus 401 for surveillance, since a motion picture of an appropriate image quality may be reproduced according to the traffic information or the event information, surveillance downtime may be reduced as use of a recording medium is efficiently controlled. The above change of the operating functions of the recording apparatus 401 for surveillance may be used later for searching for an event or an image.

In other words, an efficient recording apparatus for surveillance capable of reducing surveillance downtime using the external information and also reducing a capacity of a recording medium by reducing a motion picture of an appropriate image quality according to the external information may be provided.

Figure 5:
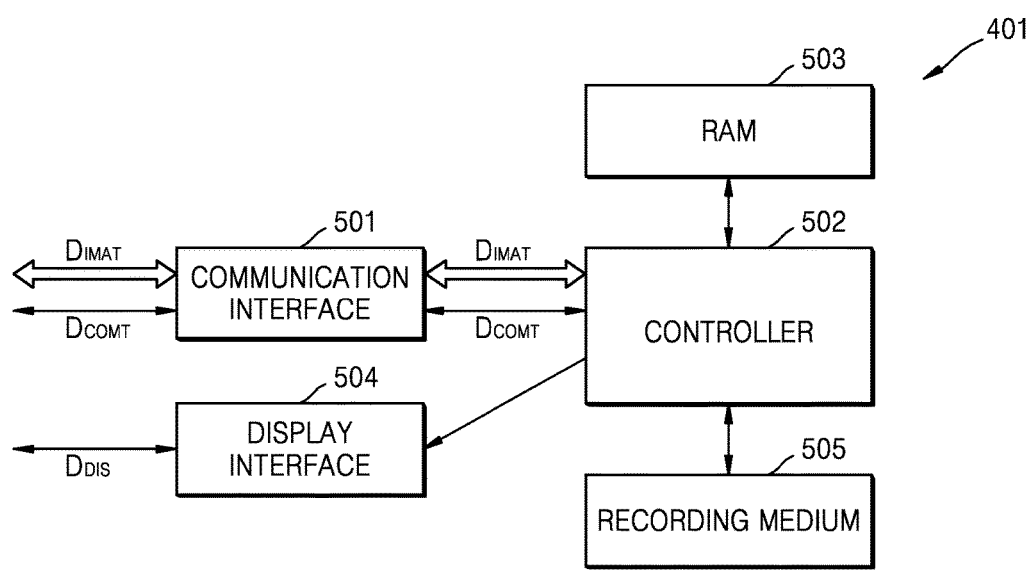
FIG. 5 is a block diagram of a structure of a recording apparatus for surveillance included in the surveillance system of FIG. 4, according to an exemplary embodiment.

A surveillance system according to a different exemplary embodiment may include the surveillance cameras 101a to 101n, and the recording apparatus 401 for surveillance for storing the live-view motion picture data $D_{IMA}$ received from each of the surveillance cameras 101a to 101n in a recording medium 505 illustrated in FIG. 5.

The recording apparatus 401 for surveillance according to the present exemplary embodiment may receive the external information from the external server via the Internet 102, and change the operating functions of at least one surveillance camera related to the external information among the surveillance cameras 101a to 101n.

While employing existing surveillance cameras, a surveillance system according to the present exemplary embodiment may provide efficient surveillance cameras capable of reducing surveillance downtime by using the external information. The change in the operating functions of the surveillance camera 101n may be used for searching for an event or an image.

FIG. 5 is a block diagram of a structure of the recording apparatus 401 for surveillance included in the surveillance system of FIG. 4, according to an exemplary embodiment.

Referring to FIG. 5, the recording apparatus 401 for surveillance according to the present exemplary embodiment may include a communication interface 501, a controller 502, a random access memory (RAM) 503 as a volatile memory, a recording medium 505, and a display interface 504. The communication interface 501 may perform a function of a network interface card (NIC).

Referring to FIGS. 4 and 5, the communication interface 501 may receive composite motion picture data $D_{IMAT}$ and a composite communication signal $D_{COMT}$ from the surveillance cameras 101a to 101n, via the Internet 102.

The controller 502 may process packets received in a data receiving mode and load the packets in the RAM 503.

Alternatively, the controller 502 may generate and output packets in a data transmission mode. In other words, the controller 502 may transmit motion picture data loaded in the RAM 503 by channels to a plurality of client terminals 403a to 403n, via the communication interface 501.

The data receiving mode and the data transmission mode of the recording apparatus 401 for surveillance according to the present exemplary embodiment may be performed by layers according to the transmission control protocol/internet protocol (TCP/IP).

The controller 502 may output the motion picture data loaded in the RAM 503 by channels according to a user input through the display interface 504. Accordingly, a display apparatus (not shown) connected to the display interface 504 receives an input of a motion picture signal $D_{DIS}$ via the display interface 504 and displays live-view motion picture.

The controller 502 may store the motion picture data loaded in the RAM 503 in the recording medium 505.

Figure 6:
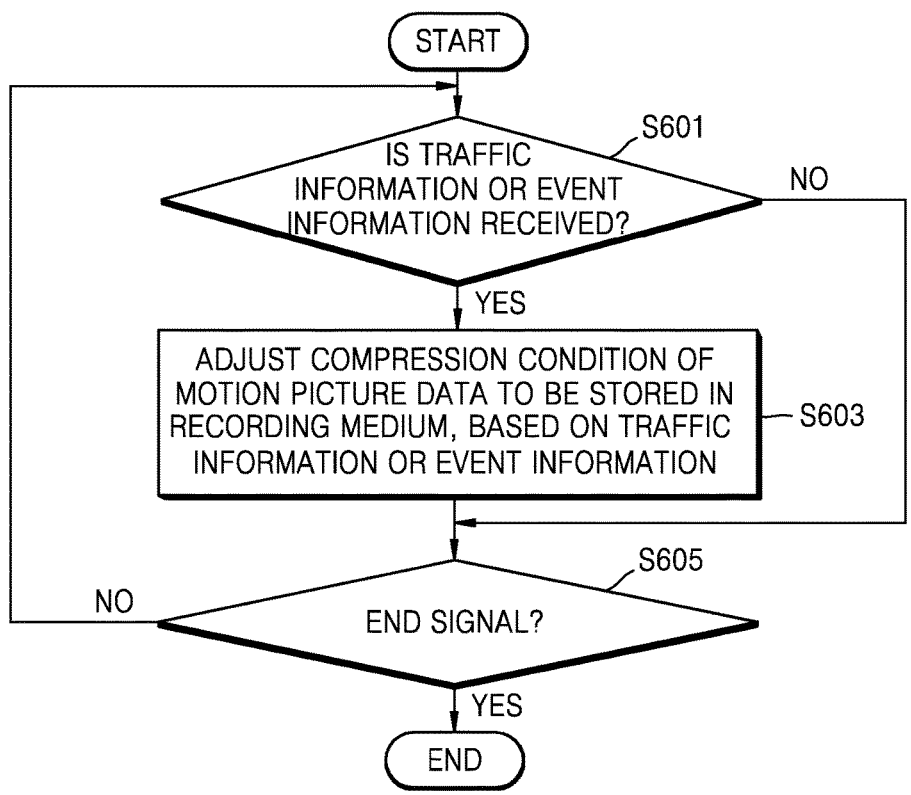
FIG. 6 is a flowchart of an operation of the recording apparatus for surveillance of FIG. 5, according to an exemplary embodiment.

FIG. 6 is a flowchart of an operation of the recording apparatus 401 for surveillance of FIG. 5, according to an exemplary embodiment.

Referring to FIGS. 4 to 6, the controller 502 determines whether the communication interface 501 receives traffic information from the traffic information server 105 and/or event information from the event information server 106, via the Internet 102 (S601).

When the communication interface 501 receives traffic information and/or event information, the controller 502 controls a compression function of the motion picture data to be stored in the recording medium 505, based on the traffic information or the event information (S603).

For example, the controller 502 may control a compression function of the motion picture data based on the TPEG information. When receiving the motion picture data from a traffic monitoring camera located at a place where a current traffic amount is large, the controller 502 may control the compression rate of a motion picture to be relatively low. As a result, the compression rate of a motion picture of each channel may be adjusted to be inversely proportional to the traffic amount.

In another example, the controller 502 may control a compression function of the motion picture data based on the event information. When the motion picture data is received from the crime prevention camera located in a place where an event is occurring, the compression rate of a motion picture may be adjusted to be relatively low.

S601 and S603 may be repeatedly performed until an end signal is generated (S605).

Figure 7:
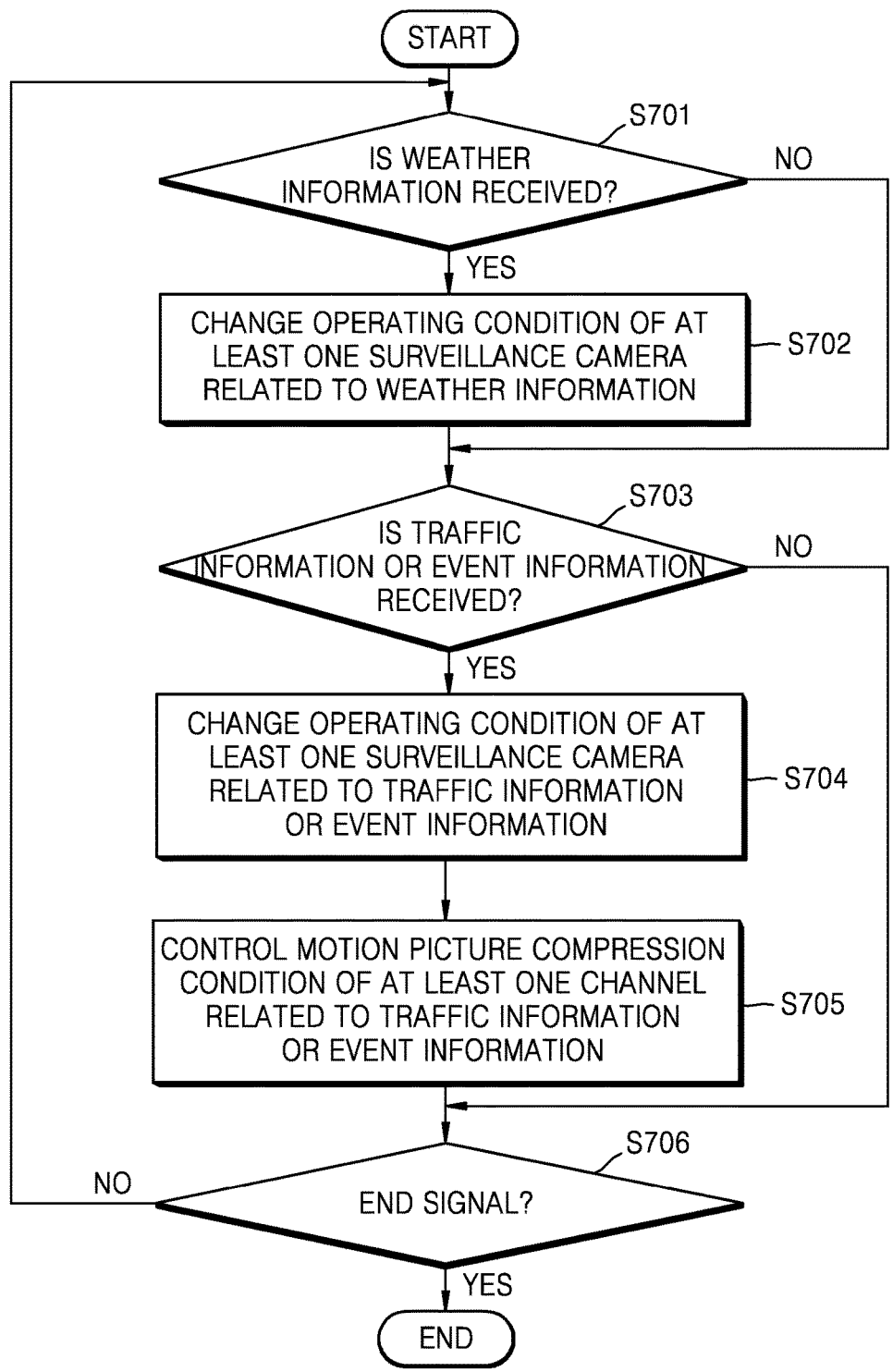
FIG. 7 is a flowchart of operations of the recording apparatus for surveillance and the surveillance camera of FIG. 5, according to an exemplary embodiment.

FIG. 7 is a flowchart of operations of the recording apparatus 401 for surveillance and the surveillance camera of FIG. 5.

Referring to FIGS. 4, 5, and 7, when the communication interface 208 receives weather information from the weather information server 104 via the Internet 102 (S701), the controller 502 changes the operating functions of at least one surveillance camera related to the weather information among the surveillance cameras 101a to 101n (S702). For example, the controller 502 may control defog processing of an image, operation of a heater, operation of a wiper, and an output image profile of the surveillance camera 101n related to the weather information by time slots. The controller 502 may control the surveillance camera 101n related to thunder and/or lightning information not to perform detection of an audio event. The controller 502 may control the switch times between a daytime operation mode and a nighttime operation mode of the surveillance camera 101n related to sunrise and/or sunset information.

When the communication interface 208 receives traffic information from the traffic information server 105 and/or event information from the event information server 106 via the Internet 102 (S703), the controller 502 performs S704 and S705.

In S704, the controller 502 changes the operating functions of at least one surveillance camera related to the traffic information and/or the event information among the surveillance cameras 101a to 101n. For example, the controller 502 may control at least one of a frame resolution, a motion picture compression rate, a BPS, and an FPS of the traffic monitoring camera located at a place where a current traffic amount is large, to be relatively high, based on the TPEG information.

In another example, the controller 502 may control at least one of a frame resolution, a motion picture compression rate, a BPS, and an FPS of a crime prevention camera located in a place where an event is occurring.

In S705, the controller 502 controls the compression function of a motion picture of at least one channel related to the traffic information and/or the event information.

For example, upon receiving the motion picture data from a traffic monitoring camera located in a place where current traffic is heavy, the controller 502 may control the compression rate of a motion picture to be relatively low.

In another example, upon receiving the motion picture data from a crime prevention camera located in a place where an event is occurring, the controller 502 may control the compression rate of a motion picture to be relatively low.

S701 to S705 are repeatedly performed until an end signal is generated (S706).

Accordingly, the surveillance systems according to the above-described exemplary embodiments may provide efficient surveillance cameras having reduced surveillance downtime by using the external information.

The inventive concept can also be embodied as computer readable codes on a non-transitory computer readable recording medium. The non-transitory computer readable recording medium is any data storage device that can store data which can thereafter be read by a computer system. Examples of the non-transitory computer readable recording medium include read-only memory (ROM), random-access memory (RAM), CD-ROMs, magnetic tapes, floppy disks, optical data storage devices, etc. The non-transitory computer readable recording medium can also be distributed over network coupled computer systems so that the computer readable code is stored and executed in a distributive manner. Also, functional programs, codes, and code segments for accomplishing the present inventive concept can be easily construed by programmers skilled in the art to which the present inventive concept pertains.

Alternatively, the computer program may be specially designed or configured for the present inventive concept or may be well-known to one of ordinary skill in the field of computer software. An example of a computer program may include not only machine codes written by a compiler but also high-level language codes executed by a computer using an interpreter.

The controller 207 and the communication interface 208 illustrated in FIG. 2 or the controller 502 and the communication interface 501 illustrated in FIG. 5 may be embodied as an independent network apparatus connected to the surveillance camera of FIG. 2 101n and/or the recording apparatus 401 of FIG. 5 through a wired or wireless network, or included in at least one of the surveillance camera and the recording apparatus 401 as illustrated in FIGS. 2 and 5.

The controller 207 and the controller 502 may be embodied as various numbers of hardware, software and/or firmware structures that execute respective functions described above, according to an exemplary embodiment. For example, the controllers 207 and 502 may use a direct circuit structure, such as a memory, processing, logic, a look-up table, etc. that may execute the respective functions through controls of one or more microprocessors or other control apparatuses. Also, the controllers 207 and 502 may be specifically embodied by a module, a program, or a part of code, which contains one or more executable instructions for performing specified logic functions, and executed by one or more microprocessors or other control apparatuses. Also, the controllers 207 and 502 may further include a processor such as a central processing unit (CPU) that performs the respective functions, a microprocessor, or the like. Functional aspects of the above exemplary embodiments may be implemented in algorithms that execute on one or more processors. Furthermore, the controllers 207 and 502 may employ any number of related art techniques for electronics configuration, signal processing and/or control, data processing and the like.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While the above exemplary embodiments have been described with reference to the drawings, it will be understood by those of ordinary skill in the art that various changes in form and details may be made therein without departing from the spirit and scope of the inventive concept as defined by the following claims.

What is claimed is:

1. A network apparatus comprising:
a communication interface configured to receive external information comprising at least one of weather information, traffic information, and event information received from at least one external server over a network; and a controller configured to adjust at least one of operating functions of at least one of a camera and a recorder connected to the camera, according to the external information, wherein the weather information comprises at least one of fog information, temperature information, rainfall information, thunder information, lightning information, and sunrise sunset information, and wherein the network through which the external information is received is the Internet, wherein the controller is configured control detection of an audio event not to be performed in a time slot when at least one of thunder and lightning is expected, according to at least one of the thunder information and the lightning information.

2. The network apparatus of claim 1, wherein the operating functions comprise defog processing of an image, operation of a heater, operation of a wiper, and an image profile, by time slots, according to the weather information.

3. The network apparatus of claim 2, wherein the image profile comprises at least one of a frame resolution, an image compression rate, bits per second (BPS), and frames per second (FPS) of at least one of the surveillance camera or the recorder.

4. The network apparatus of claim 1, wherein the controller is configured to adjust times of switching between a daytime operation mode and a nighttime operation mode of at least one of the surveillance camera and the recorder, according to the weather information.

5. The network apparatus of claim 1, wherein the controller is configured to adjust an image profile of at least one of the surveillance camera and the recorder, according to at least one of the traffic information and the event information.

6. The network apparatus of claim 5, wherein the traffic information is Transport Protocol Expert Group (TPEG) information, and wherein the controller is configured to control, to be relatively high, at least one of a frame resolution, an image compression rate, bits per second (BPS), and frames per second (FPS) of at least one of the surveillance camera located in a place where an amount of a current traffic is greater than a reference amount and a recorder, based on the TPEG information.

7. The network apparatus of claim 5, wherein the controller is configured to control, to be relatively high, at least one of a frame resolution, an image compression rate, bits per second (BPS), and frames per second (FPS) of at least one of the surveillance camera located in a place where an event is occurring and a recorder, according to the event information.

8. The network apparatus of claim 1, wherein the controller is configured to perform at least one of the operating functions earlier than a start time of the operating function set according to the weather information.

9. The network apparatus of claim 8, wherein the operating functions comprise defog processing of an image, operation of a heater, operation of a wiper, and adjusting an image profile.

10. A method of controlling a camera and/or a recorder by using at least one processor, the method comprising:

receiving external information comprising at least one of weather information, traffic information, and event information received from at least one external server over a network; and adjusting at least one of operating functions of at least one of a camera and a recorder connected to the camera, according to the external information; and controlling detection of an audio event not to be performed in a time slot when at least one of thunder and lightning is expected, according to weather information comprising at least one of thunder information and lightning information, wherein the network through which the external information is received is the Internet, wherein the adjusting at least one of operating functions comprises performing at least one of the operating functions earlier than a start time of the operating function set according to the weather information, and wherein the operating functions comprise defog processing of an image, operation of a heater, operation of a wiper, and adjusting an image profile.

11. The method of claim 10, wherein the weather information comprises at least one of fog information, temperature information, rainfall information, thunder information, lightning information, and sunrise sunset information, and wherein the network through which the external information is received is the Internet.

12. The method of claim 11, wherein the operating functions comprise defog processing of an image, operation of a heater, operation of a wiper, and an image profile, by time slots, according to the weather information.

13. The method of claim 12, wherein the image profile comprises at least one of a frame resolution, an image compression rate, bits per second (BPS), and frames per second (FPS) of at least one of the camera or the recorder.

14. The method of claim 11, wherein the adjusting at least one of operating functions comprises adjusting times of switching between a daytime operation mode and a nighttime operation mode of at least one of the camera and the recorder, according to the weather information.

15. The method of claim 10, wherein the adjusting at least one of operating functions comprises adjusting an image profile of at least one of the camera and the recorder, according to at least one of the traffic information and the event information.

16. The method of claim 15, wherein the traffic information is Transport Protocol Expert Group (TPEG) information, and wherein the adjusting at least one of operating functions comprises controlling, to be relatively high, at least one of a frame resolution, an image compression rate, bits per second (BPS), and frames per second (FPS) of at least one of the camera located in a place where an amount of a current traffic is greater than a reference amount and a recorder, based on the TPEG information.

17. The method of claim 15, wherein the adjusting at least one of operating functions comprises controlling, to be relatively high, at least one of a frame resolution, an image compression rate, bits per second (BPS), and frames per second (FPS) of at least one of the camera located in a place where an event is occurring and a recorder, according to the event information.

* * * * *